United States Patent
Zhang et al.

(10) Patent No.: US 11,731,341 B2
(45) Date of Patent: Aug. 22, 2023

(54) LAMINATING APPARATUS FOR CURVED SCREEN

(71) Applicant: Yungu (Gu'an) Technology Co., Ltd., Hebei (CN)

(72) Inventors: Qi Zhang, Jiangsu (CN); Shuo Yang, Jiangsu (CN); Bin Yang, Jiangsu (CN); Yahong Yuan, Jiangsu (CN); Chunxiao Gu, Jiangsu (CN); Shanhe Wang, Jiangsu (CN); Junqiang Pei, Jiangsu (CN)

(73) Assignee: Yungu (Gu'an) Technology Co., Ltd., Langfang (CN)

( * ) Notice: Subject to any disclaimer, the term of this patent is extended or adjusted under 35 U.S.C. 154(b) by 36 days.

(21) Appl. No.: 17/521,657

(22) Filed: Nov. 8, 2021

(65) Prior Publication Data
US 2022/0063179 A1    Mar. 3, 2022

Related U.S. Application Data

(63) Continuation of application No. PCT/CN2020/111807, filed on Aug. 27, 2020.

(30) Foreign Application Priority Data

Nov. 20, 2019   (CN) .......................... 201911142222.6

(51) Int. Cl.
*B29C 63/00*      (2006.01)
*B29C 63/02*      (2006.01)
*B29L 31/34*      (2006.01)

(52) U.S. Cl.
CPC ...... *B29C 63/0073* (2013.01); *B29C 63/0047* (2013.01); *B29C 63/02* (2013.01); *B29L 2031/3475* (2013.01)

(58) Field of Classification Search
CPC ........ B29C 2063/0008; B29C 63/0047; B29C 63/0056; B29C 63/0073; B29C 63/02;
(Continued)

(56) References Cited

U.S. PATENT DOCUMENTS

2017/0129165 A1   5/2017   Lee et al.

FOREIGN PATENT DOCUMENTS

| CN | 106466955 A | 3/2017 |
| CN | 106564268 A | 4/2017 |

(Continued)

OTHER PUBLICATIONS

Machine translation of CN 207954939 date unknown.*
(Continued)

*Primary Examiner* — John L Goff, II
(74) *Attorney, Agent, or Firm* — Maier & Maier, PLLC (57) ABSTRACT

A laminating apparatus for a curved screen including a base, an elastic component, a backing plate, and a flexible pressing mold, where the backing plate is arranged above the base, the elastic component is connected to the backing plate, the flexible pressing mold covers the backing plate, and a top of the flexible pressing mold is arranged as a curved surface adapted to a shape of a screen; and the base includes a main body and two side beams connected to two sides of the main body, the side beams are higher than the main body in a vertical direction, the side beams are provided with grooves and supporting parts extending along length directions of respective side beams, and two sides of the flexible pressing mold extend outward to cover the supporting parts and reach into the grooves.

20 Claims, 4 Drawing Sheets

(58) Field of Classification Search
CPC .......... B29L 2031/3475; B32B 37/003; B32B 38/1866; H01L 51/56
See application file for complete search history.

(56) References Cited

FOREIGN PATENT DOCUMENTS

| | | | |
|---|---|---|---|
| CN | 106585045 A | 4/2017 |
| CN | 206345061 U | 7/2017 |
| CN | 107379567 A | 11/2017 |
| CN | 108016655 A | 5/2018 |
| CN | 207466065 U | 6/2018 |
| CN | 207954939 U | 10/2018 |
| CN | 208881171 U | 5/2019 |
| CN | 209216462 U | 8/2019 |
| CN | 110861290 A | 3/2020 |
| JP | 2016194670 A | 11/2016 |
| JP | 2017025237 A | 2/2017 |
| JP | 2019188629 A | 10/2019 |
| JP | 2021508617 A | 3/2021 |
| KR | 102035243 B1 | 10/2019 |
| TW | 201302439 A | 1/2013 |

OTHER PUBLICATIONS

Machine translation of CN 106585045 date unknown.*
Machine translation of CN 209216462 date unknown.*
Machine translation of CN 206345061 date unknown.*
International Search Report dated Nov. 25, 2020 in corresponding International Application No. PCT/CN2020/111807; 3 pages.
Chinese Office Action dated Dec. 29, 2020 in corresponding Chinese Application No. 201911142222.6, 18 pages.
Chinese Office Action dated Mar. 9, 2021 in corresponding Chinese Application No. 201911142222.6, 14 pages.
Notice of Allowance dated Jan. 17, 2023, in corresponding Japanese Application No. 2022-504263, 5 pages.

* cited by examiner

LAMINATING APPARATUS FOR CURVED SCREEN

CROSS-REFERENCE TO RELATED APPLICATIONS

This application is a continuation of International Application No. PCT/CN2020/111807, filed on Aug. 27, 2020, which claims priority to Chinese Patent Application No. 201911142222.6, filed on Nov. 20, 2019, and both of the aforementioned applications are hereby incorporated by reference in their entireties.

TECHNICAL FIELD

The present disclosure relates to the field of display technologies and, in particular, to a laminating apparatus for a curved screen.

BACKGROUND

With the development of display technology, users' display requirements for display screens are gradually diversified. In order to obtain a better visual experience, display screens will gradually develop towards curved surfaces. During a manufacturing process of a curved screen, a screen needs to be laminated on a cover plate. In the prior art, the screen is usually laminated on the cover plate by a laminating apparatus.

SUMMARY

Embodiments of the present disclosure provide a laminating apparatus for a curved screen to solve a problem of a poor laminating effect between a screen and a cover plate in a curved screen.

In order to achieve the foregoing objective, embodiments of the present disclosure provide the following technical solutions.

An embodiment of the present disclosure provides a laminating apparatus for a curved screen, including: a base, having a main body and two side beams connected to two sides of the main body; a backing plate, arranged above the base; an elastic component, one end of the elastic component being connected to the backing plate; and a flexible pressing mold, covering the backing plate and having a curved surface disposed in a side away from the base and adapted to a shape of the curved screen, where the side beams are higher than the main body in a vertical direction, the side beams are provided with a plurality of grooves and a plurality of supporting parts along length directions thereof, and two sides of the flexible pressing mold extend outward to cover the supporting parts and extend into the grooves.

The laminating apparatus for the curved screen provided by the embodiments of the present disclosure has the following advantages.

In the laminating apparatus for the curved screen provided by the embodiments of the present disclosure, a top of the flexible pressing mold is arranged as a curved surface adapted to the shape of the screen, which ensures uniformity of a pressure applied by the flexible pressing mold to the screen; elastic connection between the backing plate and the base ensures that the flexible pressing mold is fully extended to increase contact area with the screen; arrangement of the plurality of grooves and the plurality of supporting parts on the side beams enables edge portions of the flexible pressing mold to extend toward the screen, which increases a pressure applied by the edge portions of the flexible pressing mold to the screen, and makes the screen gradually laminated to a cover plate in a direction from middle to peripheral edges, thereby squeezing out a gas between the screen and the cover plate, reducing a possibility of black spots and bubbles being generated in the curved screen, and solving the problem of the poor laminating effect between the screen and the cover plate.

As an improvement of the laminating apparatus for the curved screen of an embodiment of the present disclosure, a first inclined plane is provided at an edge of each of the plurality of supporting parts adjacent to the plurality of grooves and a second inclined plane is provided at an edge of each of the plurality of supporting parts adjacent to the main body.

In addition to the above-described technical problem solved by the present disclosure, technical features constituting the technical solutions, and the beneficial effects brought about by the technical features of these technical solutions, other technical problems that could be solved by the laminating apparatus for the curved screen provided by the embodiments of the present disclosure, other technical features included in the technical solutions and the beneficial effects brought about by these technical features will be further described in detail in the specific implementations.

DETAILED DESCRIPTION OF THE EMBODIMENTS

During a manufacturing process of a curved screen, a laminating apparatus is usually used to laminate the screen on a cover plate. During the lamination, because a pressure in middle of the screen is greater than a pressure on edges of the screen when the laminating apparatus is in contact with the screen, the pressure on the edges of the screen cannot meet laminating requirements, that is, a laminating force between the screen and the cover plate of the curved screen is not uniform, which easily causes black spots, bubbles and other problems of poor lamination generated in the curved screen. Therefore, a problem of a poor laminating effect between the screen and the cover usually occurs in such a display screen.

In view of the above-mentioned drawbacks, embodiments of the present disclosure provide an improved technical solution. In this technical solution, a laminating apparatus for a curved screen includes a base, an elastic component, a backing plate, and a flexible pressing mold. A top of the flexible pressing mold is arranged as a curved surface adapted to a shape of a screen, which ensures uniformity of a pressure applied by the flexible pressing mold to the screen; elastic connection between the backing plate and the base ensures that the flexible pressing mold is fully extended to increase contact area with the screen; arrangement of the plurality of grooves and the plurality of supporting parts on side beams enables edge portions of the flexible pressing mold to extend toward the screen, which increases a pressure applied by the edge portions of the flexible pressing mold to the screen, and makes the screen gradually laminated to a cover plate in a direction from middle to peripheral edges, thereby squeezing out a gas between the screen and the cover plate, reducing a possibility of black spots and bubbles being generated in the curved screen, and solving the problem of the poor laminating effect between the screen and the cover plate.

Please referring to FIGS. 1-7, a laminating apparatus for a curved screen provided by an embodiment of the present disclosure includes a base 10, an elastic component, a backing plate 30 and a flexible pressing mold 40. The backing plate 30 is arranged above the base 10, one end of the elastic component is connected to the backing plate 30, and the other end is connected to the base 10. The flexible pressing mold 40 covers the backing plate 30, and a top of the flexible pressing mold 40 is arranged as a curved surface adapted to a shape of a screen. The base 10 includes a main body 11 and two side beams 12 connected to two sides of the main body 11. The side beams 12 are higher than the main body 11 in a vertical direction and are provided with a plurality of grooves 13 and a plurality of supporting parts 14 extending along respective length directions of the side beams 12. Two sides of the flexible pressing mold 40 extend outward to cover the supporting parts 14 and extend into the plurality of grooves 13.

The laminating apparatus for the curved screen provided in this embodiment is used for laminating the screen to a cover plate of the curved screen. Specifically, during a laminating process, the flexible pressing mold 40 of the laminating apparatus for the curved screen is in contact with the screen to drive the screen to be laminated to the cover plate. In the laminating apparatus for the curved screen provided in this embodiment, the flexible pressing mold 40 is in directly contact with the screen.

In this embodiment, the flexible pressing mold 40 has characteristics of soft, easy to deform, and easy to stretch. Specifically, a material of the flexible pressing mold 40 may be silicone, rubber, or TPE (Thermoplastic Elastomer), and may also be soft PVC (Polyvinyl chloride).

Figure 5:
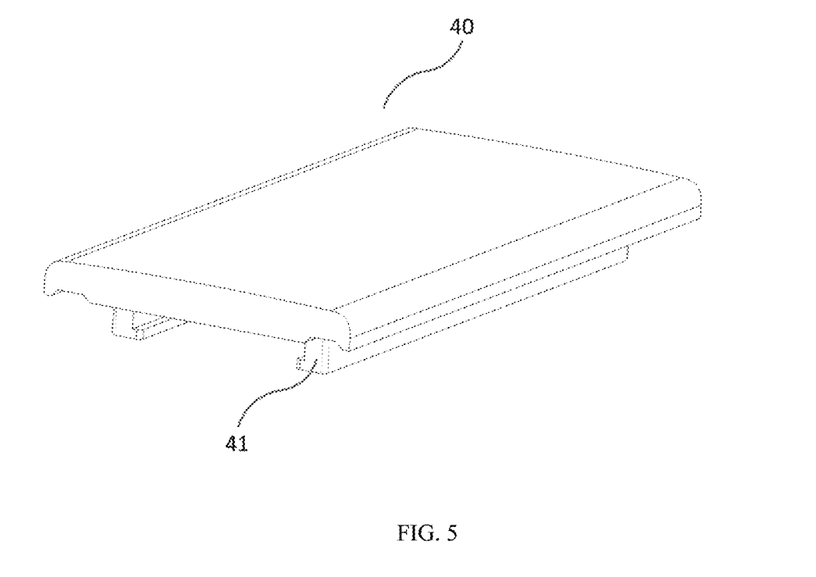
FIG. 5 is a schematic structural diagram of a flexible pressing mold in FIG. 1.
Figure 6:
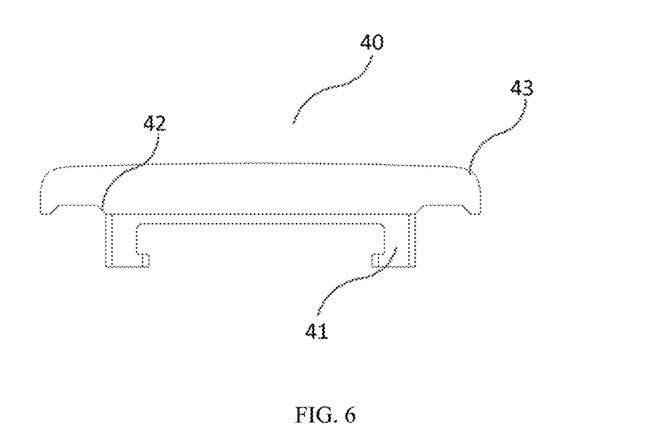
FIG. 6 is a left view of the flexible pressing mold in FIG. 5.

Since the screen of the curved screen has a curvature, the top of the flexible pressing mold 40 is used to fit the screen to be laminated. As shown in FIGS. 5 and 6, the top of the flexible pressing mold 40 in this embodiment is arranged as a curved surface adapted to the shape of the screen to ensure the uniformity of the pressure exerted by the flexible pressing mold 40 to the screen to reduce or avoid a possibility of the screen being broken due to non-uniform pressure and improve tightness of subsequent lamination therebetween.

Figure 2:
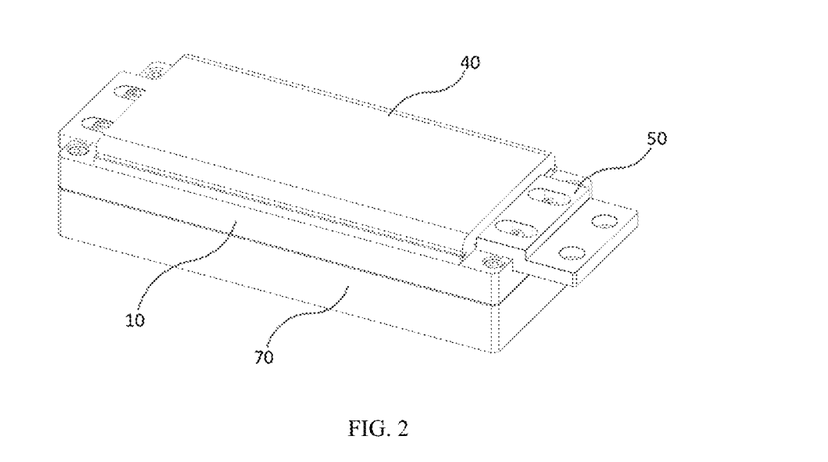
FIG. 2 is a schematic structural diagram of a laminating apparatus for a curved screen provided by an embodiment of the present disclosure.
Figure 3:
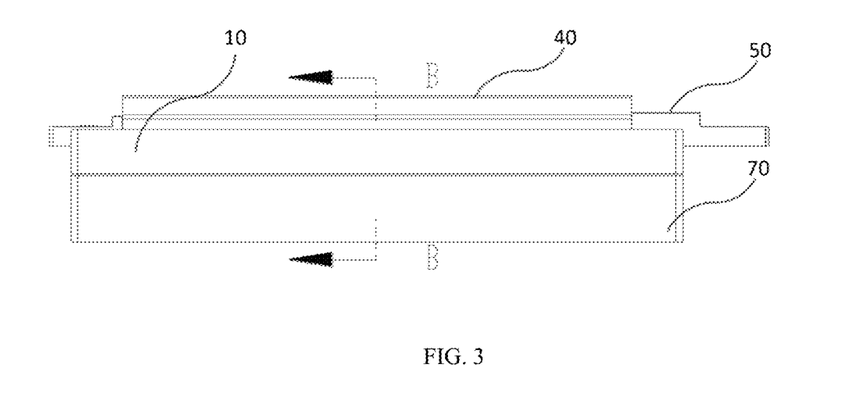
FIG. 3 is a front view of the laminating apparatus for the curved screen in FIG. 2.
Figure 4:
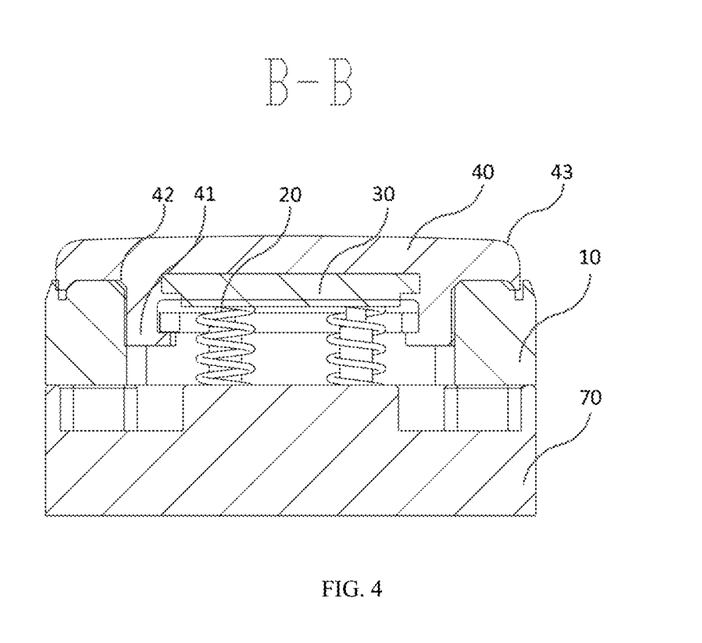
FIG. 4 is a cross-sectional view in a direction of B-B in FIG. 3.

As shown in FIGS. 2, 3, and 4, the flexible pressing mold 40 covers the backing plate 30. Specifically, the flexible pressing mold 40 covers a top surface and at least two side surfaces of the backing plate 30, and since the flexible pressing mold 40 is easy to stretch when a force is exerted thereon, the arrangement of the flexible pressing mold 40 covering the backing plate 30 in this embodiment can increase contact area between the flexible pressing mold 40 and the screen to be laminated.

Further, the backing plate 30 and the base 10 are elastically connected by the elastic component, and the elastic component may be specifically arranged as a plurality of springs, or may be arranged as an elastic rubber. The elastic component provides an elastic force for the backing plate 30 and the flexible pressing mold 40 covering the backing plate 30 during the laminating process of the curved screen, which ensures that the flexible pressing mold 40 can be fully stretched to increase the contact area with the screen, thereby making the laminating force between the screen and the cover plate uniform; and at the same time, the elastic component provides a cushion for the lamination, reducing the possibility of the screen being broken.

In addition, the laminating apparatus for the curved screen provided in this embodiment can further include a supporting platform 70 located below the base 10. It should be noted that being located below the base 10 in this embodiment refers to being located at a side of the base 10 away from the backing plate 30. The supporting platform 70 is used to place other components required for the laminating process, such as a light source. The above-mentioned elastic component can also be arranged on the supporting platform 70. Specifically, in this embodiment, the main body 11 of the base 10 has an opening disposed in the middle thereof, and one end of the elastic component is connected to the supporting platform 70 and the other end is connected to the backing plate 30 through the opening of the base 10.

Figure 1:
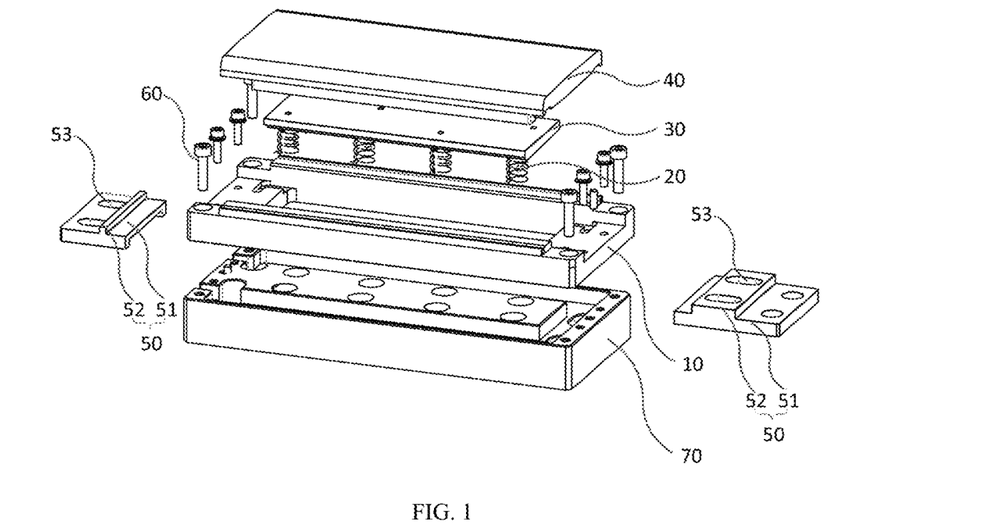
FIG. 1 is an exploded view of a laminating apparatus for a curved screen provided by an embodiment of the present disclosure.
Figure 7:
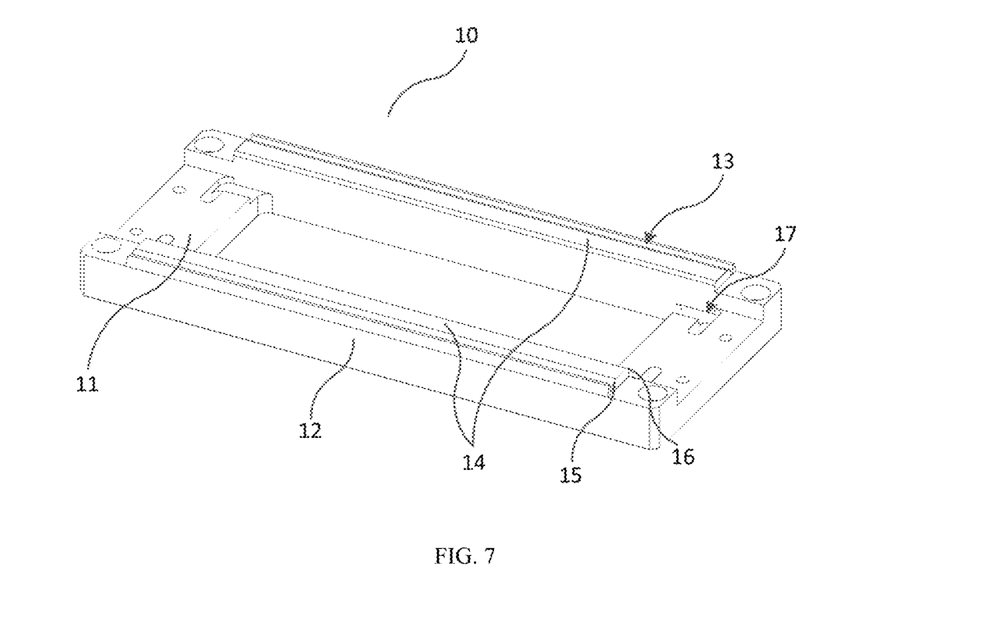
FIG. 7 is a schematic structural diagram of a base in FIG. 1.

In this embodiment, the base 10 may be made of acrylic. As shown in FIGS. 1 and 7, the base 10 includes the main body 11 and the side beams 12 located on two sides of the main body 11. The side beams 12 are fixedly connected to the main body 11. Specifically, the side beams 12 and the main body 11 can be formed as an integral structure. In the vertical direction, a top of the side beam 12 is higher than a top of the main body 11, and a bottom of the side beam 12 is flush with a bottom of the main body 11. The two side beams 12 are respectively located on opposite sides of the main body 11. Further, in this embodiment, a bottom surface of the main body 11 is a rectangular, the side beams 12 are arranged on two long sides of the main body 11, and lengths of the side beams 12 are equal to a length of the rectangular main body 11.

On the basis of the above implementations, the grooves 13 on the side beams 12 are arranged in a variety of ways. For example, the grooves 13 may be arranged on the side beams 12 from top surfaces of the side beams 12. As another example, as shown in FIG. 7, the side beams 12 have a plurality of main portions and a plurality of protrusions, each of the protrusions has a width same as a width of the main portions and a length less than a length of the main portions, and the grooves 13 are arranged downward from top surfaces of the protrusions. This embodiment does not specifically limit the arrangement of the grooves 13.

The supporting parts 14 are located on the side beams 12. As shown in FIG. 7, a part of the side beam 12 between the groove 13 and the main body 11 forms the supporting part 14, and the supporting part 14 is used to support the flexible pressing mold 40. Specifically, as shown in FIG. 4, the flexible pressing mold 40 covers the backing plate 30, and two sides of the flexible pressing mold 40 which are adjacent to the side beams 12 respectively extend outwards to cover tops of the supporting parts 14 and the two sides of the flexible pressing mold 40 extend downward to form protruding ends, and the protruding ends extend into the grooves 13 of the side beams 12 so that the flexible pressing mold 40 resists against the side beams 12.

Taking the orientation shown in FIG. 1 as an example for description, when the laminating apparatus for the curved screen provided in this embodiment is in use, the laminating apparatus for the curved screen contacts the screen and drives the screen to move toward the cover plate; a top of the screen first contacts the cover plate, and the cover plate exerts a pressure downwardly on the screen, that is, the pressure is exerted on the flexible pressing mold 40. When the pressure is equal to the elastic force exerted to the backing plate 30 by the elastic component, edges of the flexible pressing mold 40 gradually extend toward a direction where the screen is located due to being squeezed by the supporting parts 14 on the base 10. The flexible pressing mold 40 thus fully contacts the screen, and the screen and the cover plate are gradually laminated with each other in a direction from the middle to the periphery.

In summary, in the laminating apparatus for the curved screen provided by the embodiments of the present disclosure, the top of the flexible pressing mold 40 is adapted to the screen, and the flexible pressing mold 40 covers the backing plate 30 and a part of the side beams 12 of the base 10, the elastic component is arranged between the backing plate 30 and the base 10, and the base 10 is provided with the grooves 13 receiving two sides of the flexible pressing mold 40, so that the flexible pressing mold 40 can fully contact the screen during the laminating process and the screen is gradually laminated to the cover plate in the direction from the middle to the peripheral edges, thereby squeezing out the gas between the screen and the cover plate, reducing the possibility of black spots and bubbles being generated in the curved screen; and solving the problem of the poor laminating effect between the screen and the cover plate.

On the basis of the foregoing implementations, further, a first inclined plane 15 is provided at an edge of each of the plurality of supporting parts adjacent to the plurality of groove 13 and a second inclined plane 16 is provided at an edge of each of the plurality of supporting parts adjacent to the main body 11. As shown in FIG. 7, for each of the supporting parts, the supporting part 14 is located between the groove 13 and the main body 11. Since the side beam 12 is higher than the main body 11 in the vertical direction, the supporting part 14 has two edges and each of the two edges is provided with the first inclined plane 15 and the second inclined plane 16. In this embodiment, the first inclined plane 15 and the second inclined plane 16 are in contact with the flexible pressing mold 40, respectively. The first inclined plane 15 and the second inclined plane 16 can exert an oblique upward thrust on the flexible pressing mold 40, so that the edges of the flexible pressing mold 40 are in full contact with the screen, and thus the edges of the screen and the cover plate are closely laminated with each other.

Correspondingly, as shown in FIGS. 4 and 6, a part of the flexible pressing mold 40 contacting with the two edges of the supporting part 14 may also be provided with an inclined plane 42 whose slant angle may specifically be arranged to be 45° to increase a contact area between the flexible pressing mold 40 and the first inclined plane 15 and a contact area between the flexible pressing mold 40 and the second inclined plane 16.

On the basis of the above-mentioned implementations, in an implementation, each of the first inclined planes 15 is arranged as a circular arc surface. As shown in FIG. 7, an edge of the supporting part 14 adjacent to the groove 13 is of a fillet which specifically may be a fillet with a radius of 2 mm. Contact area between the fillet and the flexible pressing mold 40 is large, which further allows the edges of the flexible pressing mold 40 to be in full contact with the screen from multiple different directions, thus improving the laminating tightness between the edges of the screen and the cover plate.

In a possible implementation, a slant angle of each of the second inclined planes 16 is arranged to be 30° or 45° or 60°. In an implementation, it is easy to manufacture an inclined plane of 45°, which specifically may be an inclined plane of 1 mm.

In a possible implementation, two sides of the flexible pressing mold 40 are arranged as a pair of arc-shaped sides 43 above the plurality of grooves 13. As shown in FIGS. 5 and 6, two sides of the flexible pressing mold 40 extend outward and extend into the grooves 13 of the side beams 12 on the base 10. The arrangement of the sides above the grooves 13 as the arc-shaped sides 43 ensures that during the laminating process, the edges of the flexible pressing mold 40 gradually contacts the screen from the middle to the outside, so that the screen and the cover plate are gradually laminated with each other, and the laminating accuracy is thus improved. Further, the arc of the arc-shaped side 43 in this embodiment may be arranged to be a radius-varied arc, that is, a plurality of connected arcs with different radii, so as to adapt to a radius-varied edge of the cover plate.

In a possible implementation, the flexible pressing mold 40 is provided with a pair of extension parts 41 for covering two sides of the backing plate 30, and a bottom end of each of the extension parts 41 extend inward in a horizontal direction to contacts a bottom of the backing plate 30. As shown in FIGS. 4, 5 and 6, the extension parts 41 are arranged at a bottom of the flexible pressing mold 40 and extend toward the base 10. The extension parts 41 extend inward to cover the two sides of the backing plate 30, and the bottom ends of the extension parts 41 are in contact with the base 10 or resisted against by the base 10. The arrangement of the extension parts 41 in this embodiment improves the stability of the covering by the flexible pressing mold 40.

In a possible implementation, the laminating apparatus for the curved screen provided in this embodiment further includes two blocks 50. The two blocks 50 are arranged between the two side beams 12 and respectively abut against two sides of the flexible pressing mold 40. As shown in FIGS. 2 and 3, the top of the flexible pressing mold 40 is arranged as a curved surface. When the flexible pressing mold 40 drives the screen to contact and be laminated to the cover plate, a middle part of the flexible pressing mold 40 firstly contacts with the screen, and an edge part then contacts with the screen. The blocks 50 can prevent the flexible pressing mold 40 from stretching in the horizontal direction, so that the flexible pressing mold 40 stretches toward the screen, thereby increasing the pressure exerted on the screen by edge portions of the flexible stamp 40, and thus making laminating force between the screen and the cover plate more uniform.

In a possible implementation, the base 10 is provided with a plurality of clamping slots 17 mating with the blocks 50. In this embodiment, the two blocks 50 resist against two sides of the flexible pressing mold 40 to prevent the flexible pressing mold 40 from stretching in the horizontal direction. The base 10 is provided with the clamping slots 17 receiving the blocks 50. Specifically, the blocks 50 can be connected with the clamping slots 17 via a plurality of bolts 60.

As shown in FIGS. 2 and 3, each of the block 50 includes a bottom plate 51 and a baffle plate 52 connected with the bottom plate 51, the bottom plate 51 is resisted against clamping slots 17, and the baffle plate 52 abuts against flexible pressing mold 40. Specifically, structures of the two blocks 50 may be the same or different. On the basis of the above implementations, the bottom plate 51 is received in the clamping slots 17 of the base 10, and the connection therebetween is achieved by a connecting part such as a bolt 60 or a screw; and an inner side of the baffle plate 52 abuts against a side surface of the flexible pressing mold 40.

As shown in FIG. 1, the block 50 on the left includes a bottom plate 51 and a baffle plate 52 connected to a top surface of one of the bottom plate 51 in a vertical direction, the bottom plate 51 has a pair of clamping strips extending downwards from two sides thereof and received in the clamping slots 17 of the base 10, and the bottom plate 51 is provided with a plurality of connecting holes 53 penetrating through the bottom plate 51 for the bolt 60 to pass through; the block 50 on the right includes a bottom plate 51 and a baffle plate 52 connected to a top surface of the bottom plate 51 in a vertical direction, the bottom plate 51 is received in the clamping slots 17 of the base 10 and has a plurality of connecting holes 53 for the bolts 60 to pass through penetrating through the baffle plate 52 and the bottom plate 51 in sequence. The connecting hole 53 may be a threaded hole or a through hole, and correspondingly, the base 10 is provided with a corresponding through hole or threaded hole. In addition, a part of the bottom plate 51 on a side of the baffle plate 52 is also provided with a connection hole for connecting a mounting board. The mounting board is used to support a FPC (flexible circuit board) in a curved display screen to prevent the FPC from hanging down or bending during the laminating process.

The elastic component consists of a plurality of springs 20. Specifically, an amount of the springs 20 may be eight. As shown in FIG. 1, the base 10 is provided with a plurality of holes receiving the springs 20, and top ends of the springs 20 are fixed to the backing plate 30. In this embodiment, the eight springs 20 are connected below the backing plate 30 in a rectangular array distribution. Specifically, an elastic force of each of the springs 20 may be about 0.4N.

The flexible pressing mold 40 is arranged as a silicone pressing mold. In this embodiment, a friction coefficient of the flexible pressing mold 40 may be arranged to be 0.2 to 0.4. Specifically, the flexible pressing mold 40 is made of silica gel, and is coated with a PU (polyurethane) coating on its surface. The silicone material is soft and easy to deform, which is beneficial for the flexible pressing mold 40 to fully contact the screen without damaging the screen. The arrangement of the PU coating is beneficial to increasing a friction, improving the stability of the laminating apparatus for the curved screen during the laminating process, and preventing the non-uniform laminating force caused by slippage.

The embodiments or implementations in this specification are described in a progressive manner, each embodiment focuses on the differences from other embodiments, and the same or similar portions between the various embodiments can be referred to each other.

Finally, it should be noted that the above embodiments are only used to illustrate but not to limit the technical solutions of the present disclosure; although the present disclosure has been described in detail with reference to the foregoing embodiments, those of ordinary skill in the art should understand that the technical solutions recorded in the foregoing embodiments may still be modified, or some or all of the technical features may be equivalently replaced; and these modifications or replacements do not make the essence of the corresponding technical solutions deviate from the scope of the technical solutions of the embodiments of the present disclosure.

What is claimed is:

1. A laminating apparatus for a curved screen, comprising:
   a base, having a main body and two side beams connected to two sides of the main body;
   a backing plate, arranged above the base;
   an elastic component, one end of the elastic component being connected to the backing plate;
   a flexible pressing mold, covering the backing plate and having a curved surface disposed in a side away from the base and adapted to a shape of the curved screen, wherein the two side beams are provided with a plurality of grooves and a plurality of supporting parts extending along length directions thereof, and two sides of the flexible pressing mold extend outward to cover the plurality of supporting parts and extend into the plurality of grooves; and
   two blocks arranged between the two side beams and respectively abutting against two sides of the flexible pressing mold;
   wherein the base is provided with a plurality of clamping slots mating with the two blocks;
   wherein each of the two blocks comprises a bottom plate resisting against the clamping slots and a baffle plate abutting against the flexible pressing mold, and the baffle plate is connected to a top surface of the bottom plate in a vertical direction;
   wherein one of two bottom plates of the two blocks is provided with a plurality of connecting holes penetrating therethrough and has a pair of clamping strips extending downwards from two sides thereof and received in the clamping slots of the base.

2. The laminating apparatus according to claim 1, wherein a first inclined plane is provided at an edge of each of the plurality of supporting parts adjacent to the plurality of grooves and a second inclined plane is provided at an edge of each of the plurality of supporting parts adjacent to the main body.

3. The laminating apparatus according to claim 2, wherein each of the first inclined planes is arranged as a circular arc surface.

4. The laminating apparatus according to claim 2, wherein a slant angle of each of the second inclined planes is arranged to be 30° or 45° or 60°.

5. The laminating apparatus according to claim 1, wherein two sides of the flexible pressing mold are arranged as a pair of arc-shaped sides above the plurality of grooves.

6. The laminating apparatus according to claim 1, wherein the flexible pressing mold is provided with a pair of extension parts for covering two sides of the backing plate, and a bottom end of each of the extension parts extends inward in a horizontal direction and contacts with a bottom of the backing plate.

7. The laminating apparatus according to claim 1, wherein the other one of the two bottom plates of the two blocks is received in the clamping slots of the base and has a plurality of connecting holes penetrating through the baffle plate and the bottom plate in sequence.

8. The laminating apparatus according to claim 1, wherein the flexible pressing mold is arranged as a silicone pressing mold, a rubber pressing mold, a TPE pressing mold or a PVC pressing mold.

9. The laminating apparatus according to claim 1, wherein the two side beams are higher than the main body in a vertical direction.

10. The laminating apparatus according to claim 1, wherein the flexible pressing mold covers a top surface and at least two side surfaces of the backing plate.

11. The laminating apparatus according to claim 1, wherein the elastic component consists of a plurality of springs or is an elastic rubber.

12. The laminating apparatus according to claim 1, wherein the elastic component is connected between the backing plate and the base.

13. The laminating apparatus according to claim 1, further comprising:
   a supporting platform located below the base, wherein the elastic component is arranged on the supporting platform.

14. The laminating apparatus according to claim 13, wherein the main body of the base has an opening disposed in the middle thereof, one end of the elastic component is connected to the supporting platform, and the other end of the elastic component is connected with the backing plate through the opening of the base.

15. The laminating apparatus according to claim 1, wherein bottoms of the two side beams are flush with a bottom of the main body, and when a bottom surface of the main body is rectangular,
   the two side beams are arranged on two long sides of the main body, and lengths of the side beams are equal to a length of the main body.

16. The laminating apparatus according to claim 15, wherein the grooves are disposed on the two side beams from top surfaces of the two side beams; or,
   the two side beams have a plurality of main portions and a plurality of protrusions, each of the protrusions has a width same as a width of the main portions and a length less than a length of the main portions, and the grooves are arranged downward from top surfaces of the protrusions.

17. A laminating apparatus for a curved screen, comprising:
   a base, having a main body and two side beams connected to two sides of the main body;
   a backing plate, arranged above the base;
   an elastic component, one end of the elastic component being connected to the backing plate;
   a flexible pressing mold, covering the backing plate and having a curved surface disposed in a side away from the base and adapted to a shape of the curved screen, wherein the two side beams are provided with a plurality of grooves and a plurality of supporting parts extending along length directions thereof, and two sides of the flexible pressing mold extend outward to cover the plurality of supporting parts and extend into the plurality of grooves; and
   two blocks arranged between the two side beams and respectively abutting against two sides of the flexible pressing mold;
   wherein the base is provided with a plurality of clamping slots mating with the two blocks;
   wherein each of the two blocks comprises a bottom plate resisting against the clamping slots and a baffle plate abutting against the flexible pressing mold, the baffle plate is connected to a top surface of the bottom plate in a vertical direction;
   wherein one of two bottom plates of the two blocks is received in the clamping slots of the base and has a plurality of connecting holes penetrating through the baffle plate and the bottom plate in sequence.

18. The laminating apparatus according to claim 17, wherein the other one of the two bottom plates of the two blocks is provided with a plurality of connecting holes penetrating therethrough and has a pair of clamping strips extending downwards from two sides thereof and received in the clamping slots of the base.

19. A laminating apparatus for a curved screen, comprising:
   a base, having a main body and two side beams connected to two sides of the main body;
   a backing plate, arranged above the base;
   an elastic component, one end of the elastic component being connected to the backing plate;
   a flexible pressing mold, covering the backing plate and having a curved surface disposed in a side away from the base and adapted to a shape of the curved screen, wherein the two side beams are provided with a plurality of grooves and a plurality of supporting parts extending along length directions thereof, and two sides of the flexible pressing mold extend outward to cover the plurality of supporting parts and extend into the plurality of grooves; and
   two blocks arranged between the two side beams and respectively abutting against two sides of the flexible pressing mold;
   wherein the base is provided with a plurality of clamping slots mating with the two blocks;
   wherein at least a part of one of the two blocks is received in the clamping slots of the base and has a plurality of connecting holes penetrating therethrough; the other one of the two blocks comprises a plurality of connecting holes penetrating therethrough and a pair of clamping strips extending downwards from two sides thereof and received in the clamping slots of the base.

20. The laminating apparatus according to claim 19, wherein each of the two blocks comprises a bottom plate resisting against the clamping slots and a baffle plate abutting against the flexible pressing mold, and the baffle plate is connected to a top surface of the bottom plate in a vertical direction.

* * * * *